United States Patent [19]
Williams et al.

[11] Patent Number: 5,413,878
[45] Date of Patent: May 9, 1995

[54] SYSTEM AND METHOD FOR NETWORKING ELECTROCHEMICAL DEVICES

[75] Inventors: Mark C. Williams; John G. Wimer, both of Morgantown, W. Va.; David H. Archer, Pittsburgh, Pa.

[73] Assignee: The United States of America as represented by the Department of Energy, Washington, D.C.

[21] Appl. No.: 142,563

[22] Filed: Oct. 28, 1993

[51] Int. Cl.$^6$ .................. H01M 8/04; H01M 8/14; H01M 8/24
[52] U.S. Cl. .................................. 429/16; 429/17; 429/18; 429/32
[58] Field of Search ............ 429/32, 16, 17, 18

[56] References Cited

U.S. PATENT DOCUMENTS

| | | | |
|---|---|---|---|
| 4,080,487 | 3/1978 | Reiser | 429/16 |
| 4,714,661 | 12/1987 | Kaun et al. | 429/16 |
| 4,876,163 | 10/1989 | Reichner | 429/32 |
| 5,019,464 | 5/1991 | Mitsuda et al. | 429/16 |
| 5,082,752 | 1/1992 | Koga et al. | 429/16 |
| 5,192,627 | 3/1993 | Perry, Jr. et al. | 429/17 |
| 5,252,410 | 10/1993 | Wilkinson et al. | 429/32 |

OTHER PUBLICATIONS

Liebhafsky, H. A. et al. 1968. Fuel Cells and Fuel Batteries. New York: John Wiley & Sons pp. 111–116.
Walhood, D. G. et al. 1992. The Optimum Voltage-Current Operation of Single and Series Connected Fuel Cells. Proceedings of Int. Symp. on Solid Oxide Fuel Cells, 289–296. 2d EUR/13564.

*Primary Examiner*—Wayne Langel
*Attorney, Agent, or Firm*—David E. Breeden; Stephen D. Hamel; William R. Moser

[57] ABSTRACT

An improved electrochemically active system and method including a plurality of electrochemical devices, such as fuel cells and fluid separation devices, in which the anode and cathode process-fluid flow chambers are connected in fluid-flow arrangements so that the operating parameters of each of said plurality of electrochemical devices which are dependent upon process-fluid parameters may be individually controlled to provide improved operating efficiency. The improvements in operation include improved power efficiency and improved fuel utilization in fuel cell power generating systems and reduced power consumption in fluid separation devices and the like through interstage process fluid parameter control for series networked electrochemical devices. The improved networking method includes recycling of various process flows to enhance the overall control scheme.

25 Claims, 5 Drawing Sheets

SYSTEM AND METHOD FOR NETWORKING ELECTROCHEMICAL DEVICES

BACKGROUND OF THE INVENTION

The United States Government has rights in this invention pursuant to the employer-employee relationship between the U.S. Department of Energy and the inventors. This invention relates generally to the networking of electrochemically active devices and more particularly to improvements in process flow control systems of electrochemically active devices.

In this application the term networked or networking is defined as ducting of the anode and cathode process fluid streams between electrochemically active devices such as fuel cells, gas separation devices, concentration measurement devices, and the like such that the process flow streams are fed and recycled through the electrode flow chambers of electrochemically active devices.

Two of the most promising applications for electrochemical membranes are fuel cells and separation devices. In a fuel cell, fuel and oxidant flow on opposite sides of an ionically conductive membrane. An electrochemical potential is generated between electrodes which are mounted on either side of the membrane by converting chemical energy derived from the fuel directly into electrical energy through the oxidation of the fuel in the cell. Fuel cells take advantage of this electrochemical potential to generate electrical work. Conversely, electrochemical membrane separation devices (EMSDs) consume electrical energy as they remove selected species from a gas stream. When a voltage is supplied between the electrodes on opposite sides of a separation membrane, ions carry the species to be removed from one side of the membrane to the other. Although these applications are quite different, their general operation is based upon the same electrochemical principles. Consequently, some electrochemical membranes which have been developed for fuel cells can easily be adapted for use in separation devices.

In one form of these electrochemically active membrane devices, referred to as a molten carbonate cell, the electrode materials are usually formed of porous nickel alloys for reducing atmospheres (anode) and nickel oxide for oxidizing atmospheres (cathode). The electrolyte, typically a combination of alkali (Li, K, Na) carbonates, is contained within a porous ceramic matrix, commonly formed of lithium aluminate ($LiAlO_2$). When the electrolyte is heated to a molten state (typically in the range of from about 850° to about 975° K. at a pressure of about 1.1 to about 6 atmospheres), by any suitable heat source, the electrolyte makes contact with the porous electrodes and partially penetrates the pores of the electrodes. Gas can also diffuse into the electrodes and come in contact with the electrolyte. This creates a three-way interface in an atmosphere where carbonate ions, electrons, and gases can react. These devices may be used either as an electrochemical membrane fuel cell or an electrochemical membrane separation device (EMSD).

When the electrochemical membrane configuration is used as an EMSD, a source gas stream containing a component to be separated therefrom, such as carbon dioxide and oxygen, in the case of a molten carbonate cell is introduced into a cathode process-fluid flow channel which allows contact of the source gas with the cathode of the cell. As the source gas is channelled along the cathode, carbon dioxide and oxygen molecules diffuse into it. There, they react with electrons flowing in the cathode to form carbonate ions. The carbonate ions diffuse through the electrolyte to the anode. At the anode, the carbonate ions decompose into carbon dioxide and oxygen, releasing electrons into the anode. A voltage applied between the electrodes drives the separated species through the electrolyte as ions from one chamber to the other. The separated gases exit the cell through an anode process-fluid flow channel and the remaining unseparated gases of the source gas stream exit the cathode process-fluid flow channel.

By contrast, when this type of cell is used as a fuel cell to produce electrical energy from a fuel gas, such as hydrogen ($H_2$), the cell is formed of the same components and the electrodes are connected to an electrical load. The $H_2$ fuel is fed into the anode process-fluid flow channel and an oxidizing agent (oxidant), such as air, is fed into the cathode process-fluid flow channel along with carbon dioxide. Carbonate ions are formed at the oxidant/electrolyte interface in the cathode and transported through the electrolyte matrix to the fuel-/electrolyte interface in the anode. There, the carbonate ions react with the fuel, releasing electrons into the anode. The electrons then travel through the external load, suffering a voltage drop, and back to the cathode creating an electrical current flow in the load.

The Nernst potential is the cell voltage resulting from reversible electrode reactions in equilibrium conditions. This potential, or reversible voltage, is generated by the overall cell reaction, and is a function of the local temperature, pressure, and reactant concentrations. In a fuel cell, the minimum generated Nernst potential is the cell's maximum possible output voltage. In an EMSD, the maximum Nernst potential required for separation is the minimum possible voltage which must be supplied. As species are utilized in a fuel cell or separated in an EMSD, their concentrations change. Since the Nernst potential is strongly dependent upon the concentrations of species, it varies with the degree of utilization or separation.

In practical applications of fuel cells, individual cells are normally arranged in stacks electrically connected in series. Fuel cell stacks are typically arranged in parallel with regard to the process fluid flow. Each individual fuel cell generates work by producing current at a voltage of about 1 volt. Higher voltages are obtained by connecting many cells together electrically in series to form the stack. In the case of an EMSD, the work consumed by each cell is a product of the total charge transferred and the applied voltage. When current passes through a cell, energy losses occur, causing losses in the cell voltage, due to the ohmic resistance of the electrode and electrolyte to electron and ion flow, respectively, (ohmic polarization), the irreversibilities in the reaction process at the anode and cathode (activation polarization), and the concentration gradients in the reactants surrounding the electrodes (concentration polarization). These combined losses decrease the cell voltage below the Nernst potential corresponding to the conditions at the cell exit.

For example, in a fuel cell stack with co-current anode and cathode process-fluid flow streams, the reactant concentrations and pressure are minimum at the outlet end of the cell. Since electrochemical potential decreases with reactant concentration and pressure, the minimum potential is generated at the outlet. If conditions were such that the 15 very last electrochemical reaction were reversible and no current flowed in this region, then no losses would occur there, and the exact output voltage of each cell would be equivalent to its outlet Nernst potential. However, since the last electrochemical reaction at the outlet of a fuel cell stack is not reversible, the actual output voltage of each cell in the stack is reduced from the outlet Nernst potential by the various losses or polarizations. Thus, the power output of a given fuel cell stack is dependent upon the minimum Nernst potential minus the corresponding local lumped ohmic, activation and concentration polarization voltage loss.

Similarly, in an electrochemical separation device, the power required to effect the desired separation fraction is dictated by the maximum required Nernst potential (reversible potential) plus the local lumped polarization loss.

In an attempt to increase fuel cell efficiency, it has been suggested in the art to network the anode and cathode process streams of fuel cells in series fluid flow such that a portion of the fuel in the particular stream is consumed in each cell. In this configuration, the cell voltage of each cell contributes incrementally to the total voltage, while the utilization and current for each cell can be individually controlled to optimize power generation. For example, if a single cell is divided into three identical area cells (C1 through C3) and each cell consumes the same amount of fuel, then the total output power (P) is equal to the sum of the outputs of each of the three cells as follows:

$$P = (V_{C1} + V_{C2} + V_{C3})\frac{I}{3}, \quad (1)$$

where I is the current for the equivalent single cell. Since only the final cell voltage $V_{C3}$ is controlled by the Nernst outlet voltage corresponding to the single cell outlet voltage and the first and second cell generated voltages are greater than $V_{C3}$, the total power output is increased over that of the same fuel consumption in a single cell of identical size. In general, equal area and currents among the cell divisions is not required to gain the 15 advantage of networking fluid process streams through the cell divisions in series. Further discussion of the details of this increase in power output may be had by referring to a publication by H. A. Liebhafsky and E. J. Cairns entitled, "Fuel Cells and Fuel Batteries", New York: John Wiley & Sons, 1968, which is a guide to research and development of fuel cells and batteries.

As a result of continuing needs to improve upon the efficiency of various electrochemically active devices and to make them more attractive for electric power production and separations, the inventors have found that further improvements may be realized by not only connecting these devices in series co-current flow, but to network these devices in various series co-current, countercurrent or mixed serial/parallel flow arrangements with intermediate process fluid parameter controls.

SUMMARY OF THE INVENTION

In view of the above need, it is an object of this invention to provide a system and method for networking electrochemically active devices in which the efficiency of operation is improved.

It is another object of this invention to provide a system and method for networking electrochemically active devices which includes networking the anode and cathode process-fluid flow chambers so that the separate electrode chamber flows are networked in either serial co-current, serial countercurrent or a combination of serial and parallel flow to allow control of the process parameters in a manner to improve system efficiency.

Further, it is an object of this invention to provide a system and method for networking electrochemically active devices as in the above objects in which flow parameters are controlled among stages of the devices to improve operating efficiency of the overall system.

Yet another object of this invention is to provide a system and method of networking electrochemically active devices in which the inlet process fluid flows are controlled by recycling a portion of the product systems streams flowing from the networked devices.

In summary, the present invention relates to improvements in an electrochemically active system including a plurality of electrochemical devices each having an ionically conductive membrane, a porous anode, a porous cathode, an anode process-fluid flow chamber, a cathode process-fluid flow chamber and means for providing electrical connection between the anode and cathode. The improvement comprising: means for connecting the cathode process-fluid flow chamber of each of the plurality of electrochemical devices in a serial fluid-flow arrangement through each of the plurality of electrochemical devices; means for connecting the anode process-fluid flow chamber of each of said plurality of electrochemical devices in a fluid-flow arrangement; and, means coupled with said anode and cathode process-fluid flow chamber connecting means for controlling operating parameters of each of said plurality of electrochemical devices which are dependent upon process-fluid parameters to improve system operating efficiency.

In accordance with another aspect of this invention a method and system are provided for operating an electrochemically active system as described above which provides improvements in the operating efficiency including improved fuel utilization in fuel cell power generating systems and reduced power consumption in fluid separation devices and the like through interstage process fluid parameter control for series networked electrochemical devices.

DETAILED DESCRIPTION

The present invention will be illustrated through detailed description of its application in the connection and operation of molten carbonate fuel cells (MCFC) operated in multiple stacks of cells for the direct conversion of methane to electric power and molten carbonate electrochemical separation cells. It will be obvious to those skilled in the art from the following descriptive material that the invention is likewise applicable to any system employing a plurality of interconnected electrochemically active devices.

Figure 1:
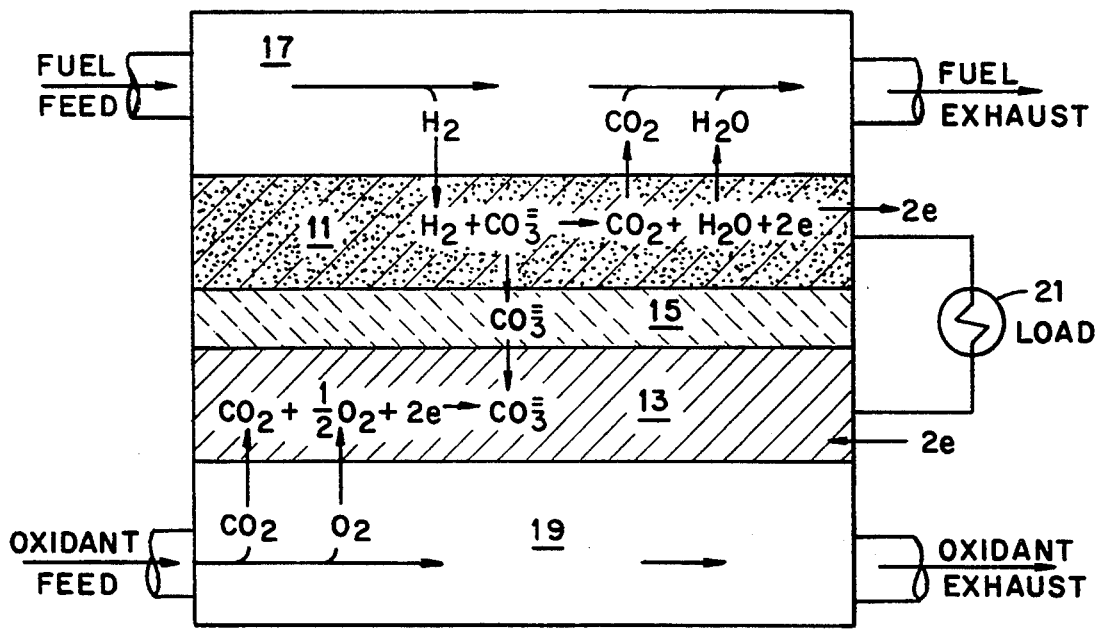
FIG. 1 is a schematic block diagram of a molten carbonate fuel cell illustrating the electrochemical reactions which take place therein.

FIG. 1 illustrates a typical MCFC. The main components of an individual cell are the anode 11, the cathode 13, and the molten carbonate electrolyte 15. Electrode materials are usually porous nickel alloys for reducing atmospheres (anode) and nickel oxide for oxidizing atmospheres (cathode). The electrolyte, typically a combination of molten, alkali (Li, K, Na) carbonates, is contained within a porous ceramic matrix, commonly made of lithium aluminate ($LiAlO_2$). An individual cell is approximately 6 mm thick. The electrolyte matrix is about 1 mm thick. The molten carbonate electrolyte, sandwiched between the anode and cathode, partially fills these porous electrodes. As shown in FIG. 1, electrochemical reactions take place at a three-phase interface formed by the electrolyte, the electrodes, and the gas streams. Carbonate ions are formed at an oxidant/electrolyte interface in the cathode and are transported through the electrolyte to a fuel/electrolyte interface in the anode. There, the carbonate ions react with the fuel, releasing electrons into the anode. The electrons then travel through an external circuit and through the load, suffering a voltage drop. Finally, the circuit is completed as the electrons return to the cathode.

In the MCFC systems illustrated in this disclosure, an MCFC designed to internally reform methane fuel into hydrogen fuel for the cell reactions in the anode process-fluid flow chamber 17 is used. The oxidant, which must include carbon dioxide and oxygen, is fed to the cathode process-fluid flow chamber 19. The following section describes the reactions that occur within an internally reforming molten carbonate fuel cell (IRMCFC). For an MCFC, methane must be reformed into hydrogen, which is more reactive. Within the anode chamber 17 of an IRMCFC, methane is reformed into hydrogen and carbon monoxide.

$$CH_4 + H_2O \rightleftharpoons 3H_2 + CO$$

$$CH_4 + 2H_2O \rightleftharpoons 4H_2 + CO_2 \quad (2,3)$$

This process eliminates the need for an external fuel reformer and heat source, and is well-suited to take place inside the IRMCFC since internal reforming directly utilizes the waste heat generated by the overall fuel cell reaction. In addition, excess steam produced by hydrogen oxidation is consumed by methane reforming. With an appropriate catalyst, such as Ni, the conversion of methane happens quickly, approaching completion by the time 50 percent of the hydrogen has been utilized. According to Le Chatelier's principle, low pressure drives reactions (2-3) forward.

When the reformed fuels diffuse through the thin electrolyte film that wets the porous anode, a three-phase interface is created at which oxidation reactions (4-6) can occur.

$$H_2 + CO_3^= \rightleftharpoons H_2O + CO_2 + 2e^-$$

$$2H_2 + CO_3^= \rightleftharpoons CO + 2H_2O + 2e^- \quad (4,5,6)$$

$$CO + CO_3^= \rightleftharpoons 2CO_2 + 2e^-$$

For hydrogen, diffusion to the electrode/electrolyte interface can also take place through the anode, since hydrogen is soluble in many metals, including nickel. The gaseous fuels react with molten carbonate ions in the electrolyte, releasing electrons directly into the anode. The products, carbon dioxide and steam, diffuse back to the electrolyte/gas interface and into the anode process-fluid flow chamber 17. The freed electrons are conducted through an external load 21 to the cathode.

Hydrogen is burned in the anode much faster than carbon monoxide. The steam produced by hydrogen oxidation is consumed by methane reforming, reactions (2-3), and reaction (7), the water-gas shift.

$$CO + H_2O \rightleftharpoons CO_2 + H_2 \quad (7)$$

The water-gas shift reaction occurs very rapidly at IRMCFC operating temperatures, which is in the range of from about 850° to about 970° K. As hydrogen is depleted, and steam and carbon dioxide are produced in equal amounts at the anode, the shift reaction proceeds. Essentially all the carbon monoxide is shifted to hydrogen before it reacts at the anode. Consequently, only hydrogen is considered to be electrochemically active, and reaction (6) is omitted from the anode reactions.

Air, which is commonly used as the oxidant for an IRMCFC, is fed into the cathode process-fluid flow chamber 19 which supplies oxygen and, unfortunately, the diluent nitrogen to the cathode. To supply the required flow of carbonate ions, the air oxidant must be supplied with carbon dioxide,as will be explained hereinbelow. Reaction (8) occurs $$\tfrac{1}{2}O_2 + CO_2 + 2e^- \rightleftharpoons CO_3^= \quad (8)$$

when oxygen and carbon dioxide diffuse to the cathode and combine with electrons to form carbonate ions. The carbonate ions complete the electrical circuit by diffusing through the electrolyte to the anode.

A fuel cell converts a portion of the free energy of reaction directly into electrical work. Free energy that is not converted to work is released as heat. However, if a fuel cell were to operate reversibly, all the free energy of reaction would be converted into electrical work. The only heat released by a reversible cell would be the product of cell temperature and entropy change. A reversible fuel cell must operate completely in equilibrium. Every reaction throughout the entire cell must be reversible, no concentration gradients can exist: in the gas streams and no ohmic losses can occur in the electrodes and electrolyte; therefore the cell current must be zero.

Electrical work is the product of charge and the voltage at which the charge is transferred. The overall reaction for the reversible IRMCFC can be based on a virtual transfer of one gram-mole of carbonate ions. Each carbonate ion carries two gram-moles of electrons. The charge per gram-mole of electrons is given by Faraday's number.

$$W_{REV} = [\text{charge transferred}][\text{voltage}] \quad (9)$$

$$= \left[ (1 \text{ gmol } CO_3^=) \left( 2 \frac{\text{gmol electrons}}{\text{gmol } CO_3^=} \right) \left( F \frac{\text{coulombs}}{\text{gmol electrons}} \right) \right] [E_{REV} \text{ volts}]$$

$$= 2FE_{REV} \text{ joules,}$$

where:

$F = $ Faraday's number $$= \left( 6.022045\ E + 23 \frac{\text{electrons}}{\text{gmol electrons}} \right) \left( 1.6021892\ E - 19 \frac{\text{coulombs}}{\text{electron}} \right)$$

$$= 96,485 \frac{\text{coulombs}}{\text{gmol electrons}}.$$

The Nernst potential is the force that drives reversible electrode reactions in equilibrium conditions. This force, or reversible voltage, is generated by the overall cell reaction, and is a function of the local temperature, pressure, and reactant concentrations. As pointed out above, the Nernst potential is the maximum voltage that can be generated from the overall cell reaction. The Nernst potential can be expressed as follows:

$$E_{REV} = -\frac{\Delta G^\circ}{2F} - \frac{RT}{2F} \ln \frac{[P_a X_{(H2O)e} X_{(CO2)e}]}{[(P_c)^{3/2} X_{(H2)e} (X_{(O2)e})^{\frac{1}{2}} X_{(CO2)e}]}, \quad (10)$$

where:

$E_{REV}$ = Nernst Potential, (volts), $\Delta G^\circ$ = change in standard free energy, $\left( \frac{J}{\text{gmol } CO_3^=} \right)$ $R$ = Universal Gas Constant, $\left( 8.1314 \frac{J}{K \text{ gmol } CO_3^=} \right)$ $T$ = cell temperature, (Kelvin)
$X$ = equilibrium mole fractions,
$P_a$ = equilibrium anode chamber pressure,
$P_c$ = equilibrium cathode chamber pressure.

As reactants are utilized, their concentrations change. Since the Nernst potential is strongly dependent upon the concentrations of reactants, it varies with the degree of utilization. An IRMCFC was simulated with fuel utilizations ranging from nearly 0 to 99 percent. In this study, fuel utilization is defined as the fraction of the inlet fuel stream's oxygen demand that is satisfied in a single pass through a cell. Cell temperature, fuel feed (flow rate and composition), and oxidant feed were the same for each simulation. For each fuel utilization, the reactant exhausts were brought to equilibrium and the Nernst potential was calculated. At the cell outlet, the final reaction was assumed to be reversible. These data are plotted in FIG. 2, which shows how the Nernst potential varies with fuel utilization.

Figure 3:
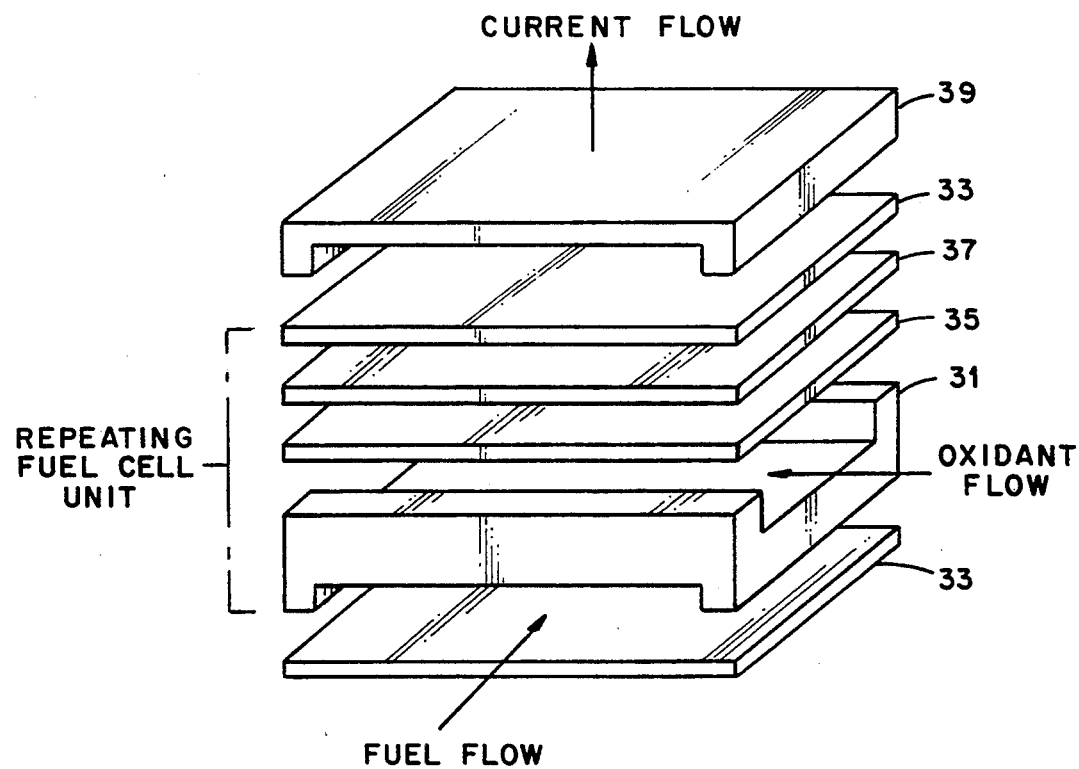
FIG. 3 is a schematic illustration of an MCFC stack configuration.

Further, as pointed out above, a single cell produces a large current at a low voltage which requires connecting a number of cells in electrical series in a stack to attain a 15 practical voltage. FIG. 3 illustrates the structure of an MCFC stack, Conductive, bipolar separator plates 31 connect individual cells in a stack both structurally and electrically. Made of stainless steel, each bipolar separator plate 31 physically separates the fuel gas stream of one cell from the oxidant gas stream of the adjacent cell. One side of each separator plate channels a fuel stream so that it flows over a porous anode 33, while the flip side channels an oxidant stream over a porous cathode 35. The anode 33 and cathode 35 are separated by the electrolyte membrane structure 37. Each bipolar separator plate also collects current, connecting adjacent cells of a stack electrically in series. From the anode 33, electrons are conducted through the bipolar separator plate 31 and into the cathode 35 of the adjacent cell. There, they react with the oxidant gas stream and carbonate ions are formed. The carbonate ions diffuse through the electrolyte structure 37 and into the same cell's anode 33, where they react with the fuel gas stream, releasing electrons into the anode. Electrons are conducted in this manner through all the cells, establishing direct current (dc) through the stack. An external circuit connects a load between the two end plates 39 of the stack, only one of which is shown, completing the circuit, as illustrated in FIG. 1.

The dc power that an MCFC stack produces can be used, without conversion, for some applications, such as transportation and chemical processing. However, for most purposes it needs to be converted to ac (alternating current) by a power conditioning unit. If an MCFC power plant is composed of multiple stacks, they could be connected electrically to the power conditioning unit in series, in parallel, or independently. If connected in series, each stack would have the same current; if connected in parallel, each stack would have the same voltage.

Since cells within a stack are connected electrically in series, the same current must flow through each one. To achieve the stack current, each cell must transfer an equivalent number of carbonate ions across its electrolyte. Therefore, it is ideal if the fuel and oxidant feed streams are evenly distributed to each cell within a stack. Present manifold designs, however, have not been able to achieve this, and cells are typically supplied with unequal reactant flows. Such an irregular distribution of reactants results in decreased stack voltage, especially at higher utilizations.

For higher fuel utilizations, the net effect of irregular flows is a voltage loss. Although some cells in a stack with irregular flows produced increased voltages, they cannot compensate for the decreased voltages generated by the remaining cells. The consequences of flow variability get much more severe as fuel utilization approaches 100 percent. Unfortunately, this serves to discourage operation at high utilizations. In conventional configurations, the single-pass utilization of each reactant stream is accomplished entirely within one stack. Therefore, when high utilizations are attempted, the low voltage that is generated adversely affects the total power production. This limits the reactant utilization that can be practically attained.

Figure 2:
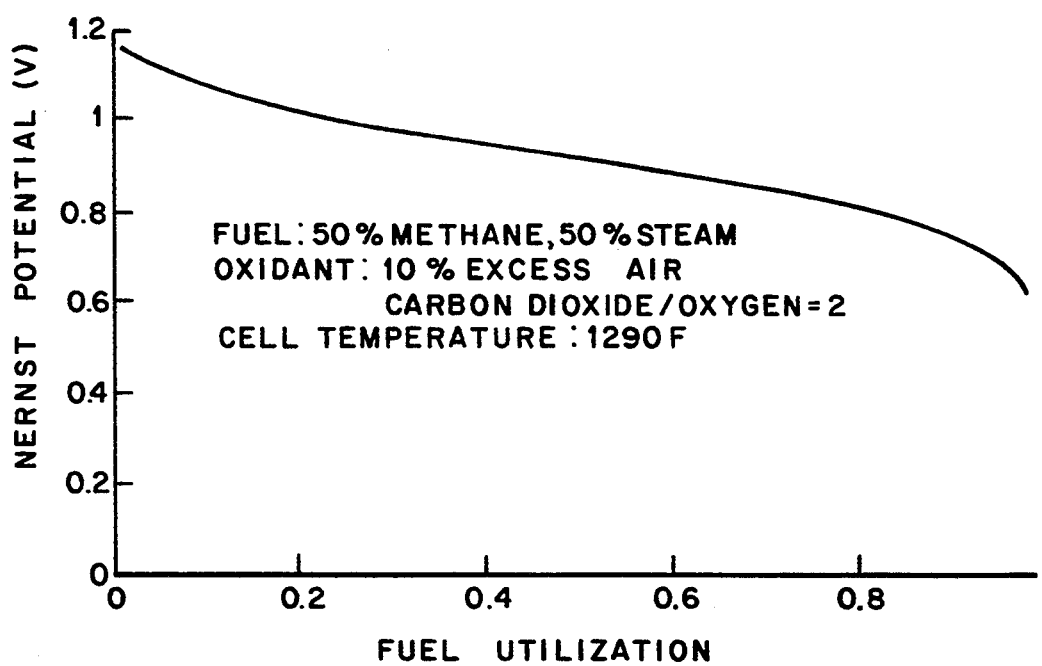
FIG. 2 is a plot of the Nernst potential versus fuel utilization in a molten carbonate fuel cell under the specified conditions. This plot illustrates how the Nernst potential varies with fuel utilization.
Figure 5A:
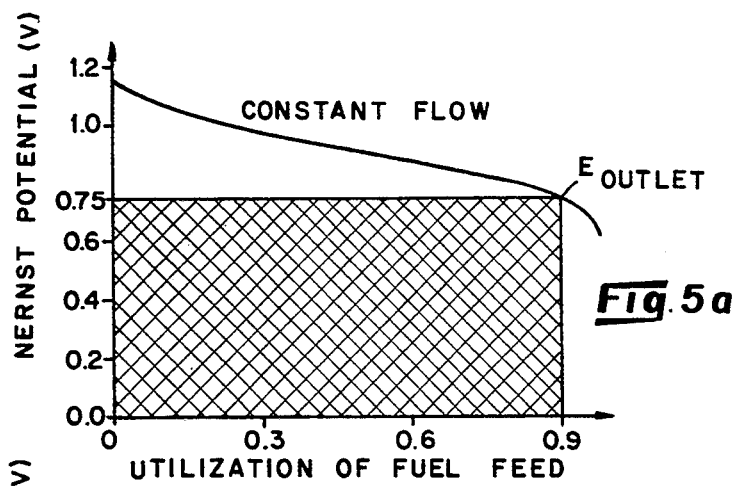
FIGS. 5a and 5b are graphs of the Nernst potential versus fuel utilization which illustrate the difference in power generation between single and multiple serially networked fuel cells.

MCFC cell networks produce more power than conventional configurations because they more closely approximate a reversible process. To illustrate this fact, consider Figures 5a and 5b, which illustrates the increase in output power when cells are networked in series. FIG. 5a is a graph of the Nernst potential versus fuel utilization for a single cell which is capable of generating a maximum Nernst potential, the potential at the outlet of the single stack, of 0.75 volts at 90% fuel utilization. It will be understood that the same fuel streams as that shown in FIG. 2 are used. Since fuel utilization is directly proportional to the charge transferred across the electrolyte, the shaded area of the graph within the horizontal and vertical lines drawn between the respective axes and the point $E_{outlet}$ on Nernst potential curve (FIG. 5a) represent power, i.e., the product of voltage and current. If reversibility is assumed at the outlet of the cell, no voltage losses are deducted from the Nernst potential. Therefore, each shaded area represents the maximum power that the single cell could actually generate.

Figure 5B:
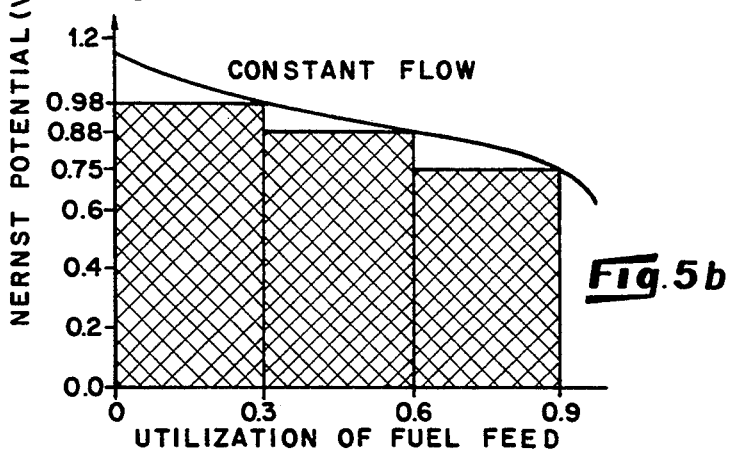

In FIG. 5b three cells are networked in series (with co-current flow of the anode and cathode process fluid streams) so that each utilizes 30 percent of the fuel. The current generated by each cell in FIG. 5b is one third of the current generated in the single cell in FIG. 5a. Each cell in the system of FIG. 5b produces a different voltage. At the exit of the first cell a high Nernst potential is generated because 70% of the fuel is still unburned. Likewise, at the exit of the second cell, 40% of the fuel remains unburned, generating another improved Nernst potential. Only ten percent of the fuel remains at the exit of the third cell, yielding the same Nernst potential that the single cell in FIG. 5a produced. The three-cell network can produce more power because two-thirds of the total charge is transferred at increased voltages. Comparing the shaded areas of the graphs illustrates the additional power that can be produced by networking cells or stacks of cells in series.

Assuming the systems in FIG. 5 are fuel cell stacks and fed the fuel and oxidant streams described in FIG. 2, each system would achieve the same total fuel utilization (90 percent) across the same total electrode area and each stack would have the same average current density. Irreversible voltage loss is mainly a function of current density and stack temperature. Since these parameters are equivalent in each stack, it is assumed that each stack would suffer approximately the same voltage losses. Each cell's outlet Nernst potential would be reduced by approximately the same amount.

Although each stack added to a series network will improve the system's efficiency, the incremental benefit obtained with each additional stack diminishes. A finite number of stacks could adequately, but not exactly, approach a reversible process. In a practical network, the number of stacks would be limited by economic, space, and design constraints.

As pointed out above, it has been suggested to increase efficiency by networking cell stacks in series. However, since the overall IRMCFC reaction is exothermic, the temperatures of the fuel and oxidant streams generally increase with reactant utilization. In addition, electrochemical potential, and therefore current density, decreases with reactant utilization. When fuel and oxidant streams flow co-currently between stacks, their temperatures increase together and their electrochemical potentials decrease together. This tends to create non-uniform temperature and current density distributions between stacks networked in series.

Figure 4:
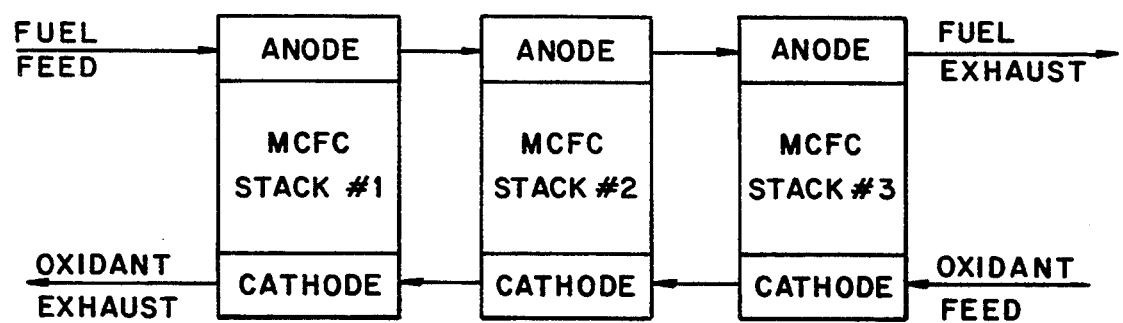
FIG. 4 is a schematic block diagram illustrating the networking of three MCFC stacks according to the present invention in which the anode and cathode process-fluid flow channels are connected in a countercurrent serial flow arrangement.

In accordance with the present invention, it has been found that when the fuel-stream flows countercurrent to the oxidant stream, as shown in FIG. 4, temperature and current density distributions are more uniform. A uniform temperature distribution allows stacks to be operated nearer their maximum operating temperature. This reduces the total voltage polarization, which generally decreases as temperature increases.

Figure 6:
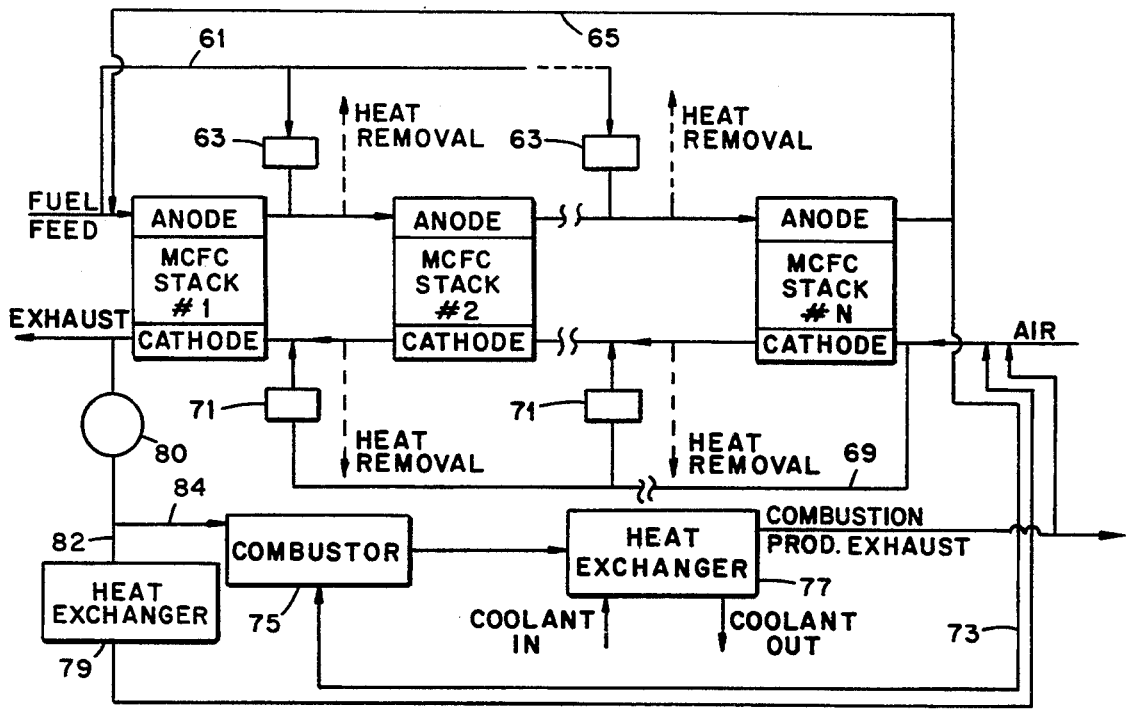
FIG. 6 is a block diagram of a fuel cell system networked in serial countercurrent process-fluid flow illustrating the interstage controls of the anode and cathode process streams according to the present invention.

Referring now to FIG. 6, wherein there is shown a networked stack system of N stacks connected for operation according to the present invention. The system is connected in a countercurrent process stream flow arrangement as shown in FIG. 4. In an internal reforming MCFC, the fuel, which is methane, is fed into the anode process-fluid 10 flow channel of stack 1 and flows in series through the anode channels of each remaining stack. The oxidant, which in this case is air, is fed in the same manner in a countercurrent serial flow arrangement through the cathode process-fluid flow channels beginning with the Nth stack. A portion of the fuel is fed forward through a feed line 61 to individual controllers 63 for each of the remaining stages 2 through N so that controlled portions of 15 the methane feed can be injected into the fuel feed lines between stacks to optimize fuel consumption over the entire system. Further, a portion of the fuel stream exhaust from the Nth stage is fed back to the first stage through a fuel feedback line 65.

To further optimize the process stream parameters, a portion of the oxidant stream may be fed forward through a line 69 to controllers 71 to adjust the cathode stream in the same manner as with the anode stream to maintain the desired composition for a particular design.

In a series of IRMCFC stacks, essentially all of the methane is reformed. The exhaust from the last stack's anode flow chamber is a high temperature mixture of the products of combustion (steam and carbon dioxide) and unburned fuel (hydrogen and carbon monoxide). Initially, the fuel feed is at ambient temperature and does not contain steam, which is necessary to reform methane and prevent carbon deposition. Therefore, it is beneficial to recycle a portion of the exhaust and mix it with the network's fuel feed. The high temperature anode exhaust heats the fuel feed towards the first stack's inlet temperature, as well as provide it with the steam it needs to reform methane and prevent carbon deposition. (Ideally, carbon dioxide would be efficiently separated from the anode exhaust, so only steam and unburned fuel would be recycled to the anode inlet. This would prevent the fuel feed from being diluted with carbon dioxide.)

Further, as shown in FIG. 6, a portion of the fuel exhaust stream is fed through a line 73 to a combustor 75 so that any unburned fuel is burned prior to being fed to the input cathode stream at the Nth stage. Further, a portion of the cathode output stream from stage 1 is also fed back to combustor 75 where it is combined with the anode-cathode recycle stream so that the leftover oxygen oxidizes the unburned fuel in the anode exhaust being fed back to the cathode to enhance the carbon dioxide to oxygen ratio. A carbon dioxide to oxygen ratio of two is required for the stoichiometry of the electrochemical reaction. Since the oxidant is air, which does not have a carbon dioxide to oxygen ratio of two, and the anode exhaust is rich in carbon dioxide, the ratio may be increased by feeding back a sufficient portion of the anode exhaust to mix with the oxidant feed to raise the ratio to the appropriate level.

The stack temperatures are controlled by recycling cooled oxidant through the cathodes to carry away heat. The portion of air that is required to sufficiently cool the stacks is continuously recycled through the stack network through lines 82 and 84 using an air circulator 80. (Two feedback lines are used so that the firing temperature of combustor 75 can be carefully controlled by the flow rate of line 84 alone, independent of the additional flow rate needed to sufficiently cool the stack network in line 82.) Heat is removed from lines 82 and 84 by passing them through heat exchangers 77 and 79, respectively. The heat exchangers transfer the waste heat carried away from the IRMCFC stacks to a heat recovery system (not shown), where it is utilized. Sufficient heat is retained at the exits of both heat exchangers to maintain the appropriate stack inlet temperature.

Thus, it will be seen that the composition of reactant streams can be optimized between stacks by injecting a reactant stream through controlled feed forward streams. Further optimization may be obtained by mixing the reactant streams between stages. As previously discussed, the uneven distribution of reactants to cells within a stack produces variability in the compositions of outlet reactant streams. This leads to a reduction in stack voltage. However, when stacks are networked in series, reactant streams can be thoroughly mixed between cells. This reduces the variability in reactant composition and helps to minimize the stack voltage loss.

Between stacks networked in series, heat can be removed from the reactant streams. This may be done to control stack temperature. Or, the heat may be recovered for a combined cycle or for cogeneration. The heat in a network reactant stream can be transferred to a cooler stream in a heat exchanger, or streams of different temperature can be mixed directly.

Since the reforming of methane into hydrogen is endothermic and the reforming reaction takes place primarily at the inlet stream end of the stack, the careful distribution of methane among stacks in series will improve the thermal balance of the system by allowing waste heat to be more evenly consumed throughout the total utilization of reactants. Improved thermal balance will allow stacks to be operated nearer their maximum temperature, reducing ohmic voltage losses. However, injecting portions of the fuel feed between stacks in series decreases the Nernst potential of every stack except the last one, since less fuel passes through each preceding stack.

Due to certain structural limitations of an IRMCFC stack, its operating temperature must be kept within an acceptable range. A lower temperature limit, the freezing point of the molten carbonate electrolyte, $\simeq 825°$ K. ($\simeq 1000°$ F.), must not be approached. Near this freezing point, the ionic resistivity of the electrolyte is unacceptably large. An upper temperature limit, $\simeq 970°$ K. ($\simeq 1290°$ F.), must not be exceeded because of problems with various stack materials. High temperatures, for example, accelerate electrode corrosion and electrolyte mobility (leakage) and evaporation. Since high temperatures are favored for reactant conditioning and stack efficiency, it is the upper temperature limit that is more restrictive.

The overall reaction that takes place within an IRMCFC stack is exothermic. To maintain an acceptable operating temperature, excess heat can be removed from the stacks or consumed by endothermic fuel reforming. The heat removal between stacks, indicated by the dashed arrows in FIG. 6 can be accomplished in a number of conventional ways, such as by diverting the process streams through heat exchangers. The temperature of a process stream can also be reduced by mixing it with a cooler stream.

Computer simulation studies using three stacks which compared co-current series process flow with counter-current series process flow revealed that stack temperatures are much more uniform in the series countercurrent flow arrangement even without interstage heat removal. In the series co-current flow arrangement the outlet temperatures of each stack varied between about 850° K. for the first stack in the series to about 970° K. for the last stack. However, in the countercurrent arrangement as shown in FIG. 4, with all other parameters held the same, the outlet temperatures for each stack varied between about 920° and 970° K. This improvement in uniform temperature operation allows stacks to be operated nearer their maximum operating temperature. An increase in stack temperature reduces the total voltage polarization, which generally decreases as temperature increases, Thus, it will be seen that the countercurrent system may be designed to be more efficient than earlier proposed systems.

Figure 7:
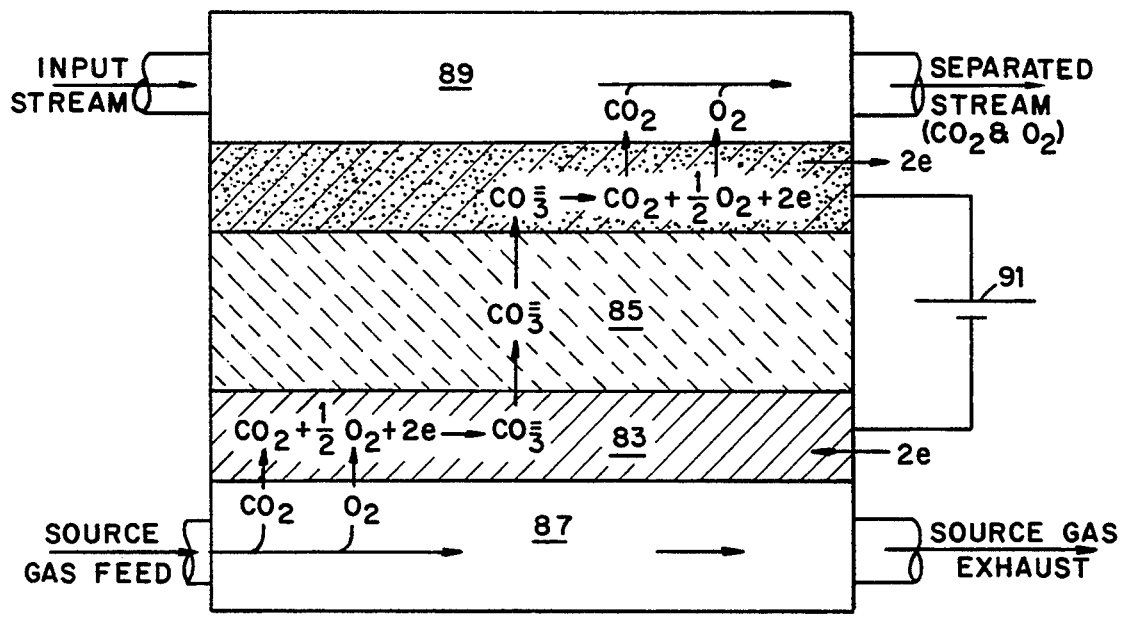
FIG. 7 is a schematic block diagram of a molten carbonate gas separation device illustrating the electrochemical reactions which take place therein.

Based on electrochemical principles, as pointed out above, the concept of networking applies to any device with an electrochemical membrane, such as a fuel cell or electrochemical membrane separation device (EMSD). As shown in FIG. 7, the molten carbonate EMSD structure is essentially identical to that of the molten carbonate fuel cell shown in FIG. 1. The separation cell consists of an anode 81, the cathode 83, and the molten carbonate electrolyte 85. Electrode materials consist of a porous nickel oxide for both electrodes, since both are exposed to an oxidizing atmosphere. The electrolyte, typically a combination of molten, alkali (Li, K, Na) carbonates, is contained within a porous ceramic matrix, commonly made of lithium aluminate ($LiAlO_2$). Shown in FIG. 7 is a cell for separating $CO_2$ and $O_2$ from a source gas such as the exhaust from a methane combustor, As shown, electrochemical reactions take place at a three-phase interface formed by the electrolyte, the electrodes, and the gas streams. As the source gas stream is channelled through the cathode flow channel 87, along the cathode 83, carbon dioxide and oxygen molecules diffuse into it. There, they react with electrons flowing in the cathode to form carbonate ions. The carbonate ions diffuse through the electrolyte 85 to the anode 81. At the anode, the carbonate ions decompose into carbon dioxide and oxygen, releasing electrons into the anode. A voltage from a voltage source 91 applied between the electrodes 81 and 83 drives the electrons from the anode back to the cathode through an external circuit. Two gas streams exit the EMSD, the source gas exhaust and the separated gas stream carried by a carrier gas stream which may consist of the cathode exhaust stream from a previous stage or a feedback stream.

Figure 8:
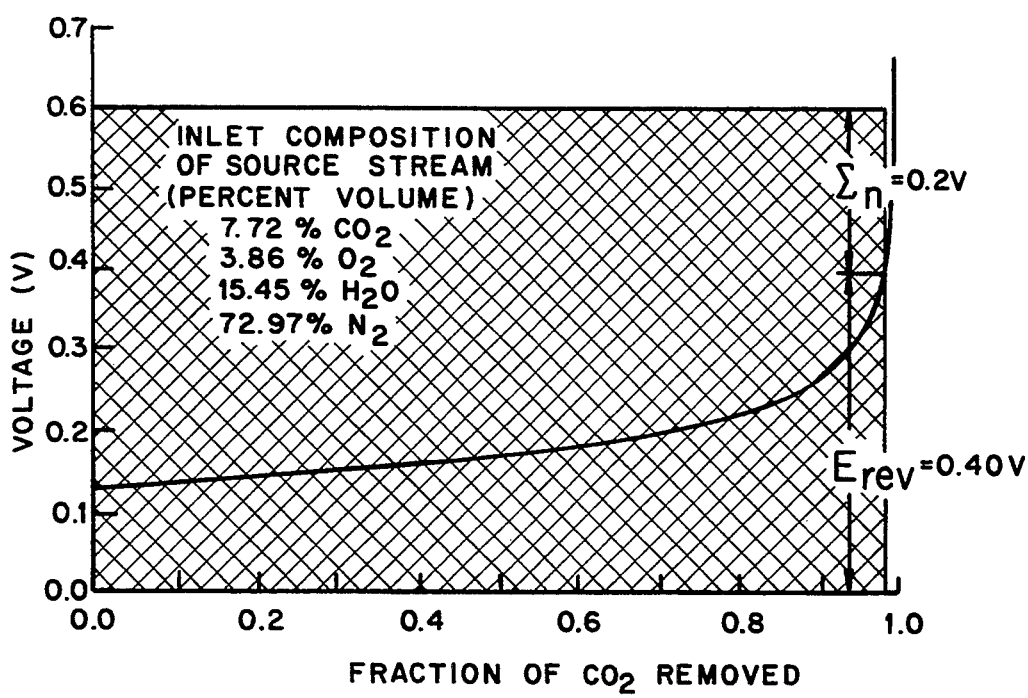
FIG. 8 is a plot of the required Nernst potential versus fractions of $CO_2$ removal in a molten carbonate separation cell for separating $CO_2$ from an exhaust stream from a methane combustor with a composition as shown. This plot illustrates how the required Nernst potential varies with the degree of separation of $CO_2$ in the cell.

The voltage which is required by a molten carbonate EMSD depends upon the fraction of carbon dioxide and oxygen to be removed from the source gas stream of a given inlet composition. As greater fractions are separated, the partial pressures of carbon dioxide and oxygen in the source gas stream decrease, and more voltage is required to "pump" them across the molten carbonate electrolyte. This voltage, which as pointed out above, is the Nernst potential in a completely reversible separation process. The relationship between reversible voltage and fraction of carbon dioxide separation is illustrated in FIG. 8. The source gas stream which was used to generate FIG. 8 had an inlet composition equal to the exhaust from a methane combustor supplied with 25% excess air.

Practical separations, however, are not completely reversible. Electronic, ionic and contact resistances in the electrolyte and electrodes result in ohmic voltage losses. Furthermore, the irreversible diffusion of carbon dioxide and oxygen to and from the electrode-electrolyte interface affects the reactant concentrations there. This reduces the electrochemical activity at the electrode, resulting in voltage losses. Additional voltage is consumed by ionic reactions at the electrodes which require an activation energy. To overcome these ohmic, concentration, and activation effects, it is necessary to apply a voltage in addition to the reversible potential. This additional voltage is equal to the sum of the various individual voltage losses, or polarizations, at the location where the required Nernst potential is a maximum, commonly at the EMSD outlet. The total voltage, V, required by an EMSD can then be written as follows:

$$V = E_{rev} + \Sigma\eta \quad (11)$$

where
$E_{rev}$ = maximum reversible potential
$\Sigma\eta$ = corresponding local total voltage polarization In a batch type separation, the supplied voltage can be increased as the separation process proceeds, until the required fraction of removal is accomplished. However, most separation processes are steady state. In a steady state separation, the electrodes must be maintained at a constant voltage. Since electrodes are generally good conductors, their surfaces are virtually isopotential. Therefore, the voltage which is necessary to drive the final fraction of carbon dioxide across the molten carbonate electrolyte must be applied along the entire length of the electrodes.

As shown in FIG. 8, if a single molten carbonate EMSD removes 99% of the carbon dioxide from the combustor exhaust, a reversible potential of 0.40 volts is required, along with additional voltage to overcome irreversibilities. A typical overpotential of 0.2 volts can be assumed. Even though a voltage this large is only required to remove the very last carbon dioxide molecule, it is applied along the entire length of the electrodes.

For each gram-mole of carbon dioxide removed from the source gas stream, a gram-mole of carbonate ions is required to carry it across the electrolyte. Faraday's number, F, is the charge, in coulombs, carried by one gram-mole of electrons. Since a gram-mole of carbonate ions possesses two gram-moles of electrons, it carries a charge of 2F coulombs. Therefore, the total charge which flows through a molten carbonate EMSD, $q_t$, is directly proportional to the fraction of carbon dioxide removed:

$$q_t = nFN_fX_r \quad (12)$$

where:

$$n = 2 \frac{\text{gmol electrons}}{\text{gmol } CO_3^=}$$

$$F = 96,485 \frac{\text{coulombs}}{\text{gmol electrons}}$$

$N_f$ = gmol $CO_2$ in feed stream $X_r$ = fraction of $CO_2$ removed

The work which is consumed by an EMSD, W, is the product of the total charge transferred, $q_t$, and the applied voltage, V.

$$W = q_t V$$

$$W = nFN_fX_rV \quad (13,14)$$

Since the total charge transferred is directly proportional to the fraction of carbon dioxide removed, the shaded region in FIG. 8 represents the work required to achieve 99% removal.

The first law of thermodynamics relates the work that the molten carbonate EMSD consumes and the heat that it generates, Q:

$$Q - W = \Delta H \quad (15)$$

where
$\Delta H$ = enthalpy change
If the separation process occurs isothermally, and involves non-reacting gas mixtures, then there is no change in enthalpy, and the heat generated is equivalent to the work consumed:

$$\Delta H = 0$$

$$Q = W \quad (16,17)$$

To avoid certain physical problems, such as corrosion of the electrodes or freezing of the electrolyte, the molten carbonate separation device must be operated within a certain temperature range (825°–975° K.). To maintain some optimum operating temperature, the heat which is generated must be removed. For the separation in FIG. 8 (99% carbon dioxide removal in a single EMSD) the shaded region also represents the quantity of heat which must be removed to maintain isothermal operation.

Figure 10:
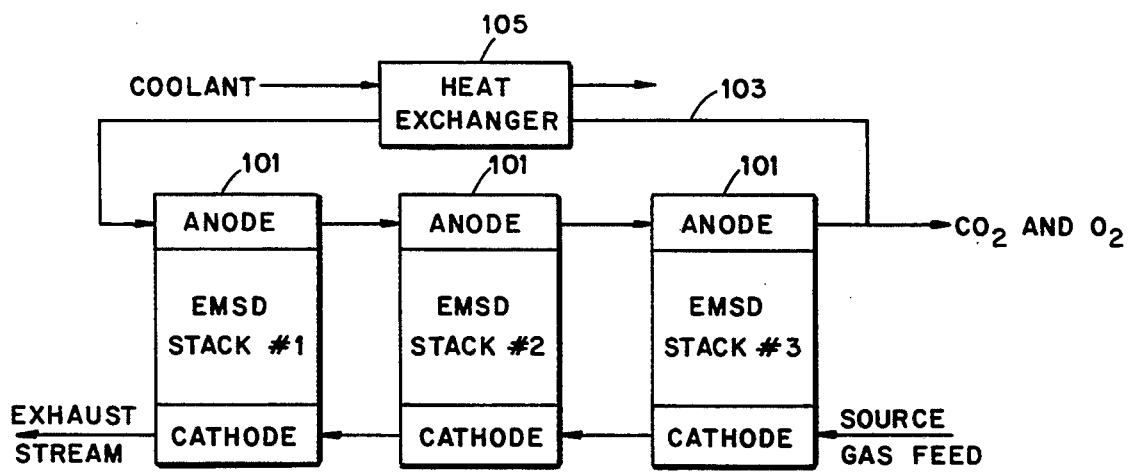
FIG. 10 is a schematic block diagram illustrating the networking of three EMSD stacks according to the present invention in which the anode and cathode process-fluid flow channels are connected in a countercurrent serial flow arrangement.

One method of heat removal is illustrated in FIG. 10. In FIG. 10, three EMSD stacks 101 are networked in a serial countercurrent flow arrangement according to the present invention as described above for the N stage fuel cell design shown in FIG. 4. A stream of carbon dioxide and oxygen is continuously recycled through the anode flow chamber of the EMSD by means of the feedback line 103. The hot anode exhaust carries away excess heat from the EMSD and is recycled through a heat exchanger 105. There, it transfers the excess heat to a coolant before returning to the anode inlet of stack 1. Heat is also carried away from the EMSD by the cathode exhaust. The cathode exhaust stream may flow through a heat exchanger before it exits an exhaust stack (not shown). In this manner the waste heat may be recovered for beneficial use.

If a large fraction of carbon dioxide must be removed from the source gas stream, the required amount of work can be reduced by placing two or more EMSDs in a network. In an EMSD network, the source stream is ducted such that it flows through individual EMSDs in series. Networking allows a steady state separation process to take place in stages. In networks, EMSDs accomplishing the initial stage(s) of separation are not burdened with the higher voltage requirement of later stages. The highest voltages are segregated to just the final stage(s) of separation.

Figure 9:
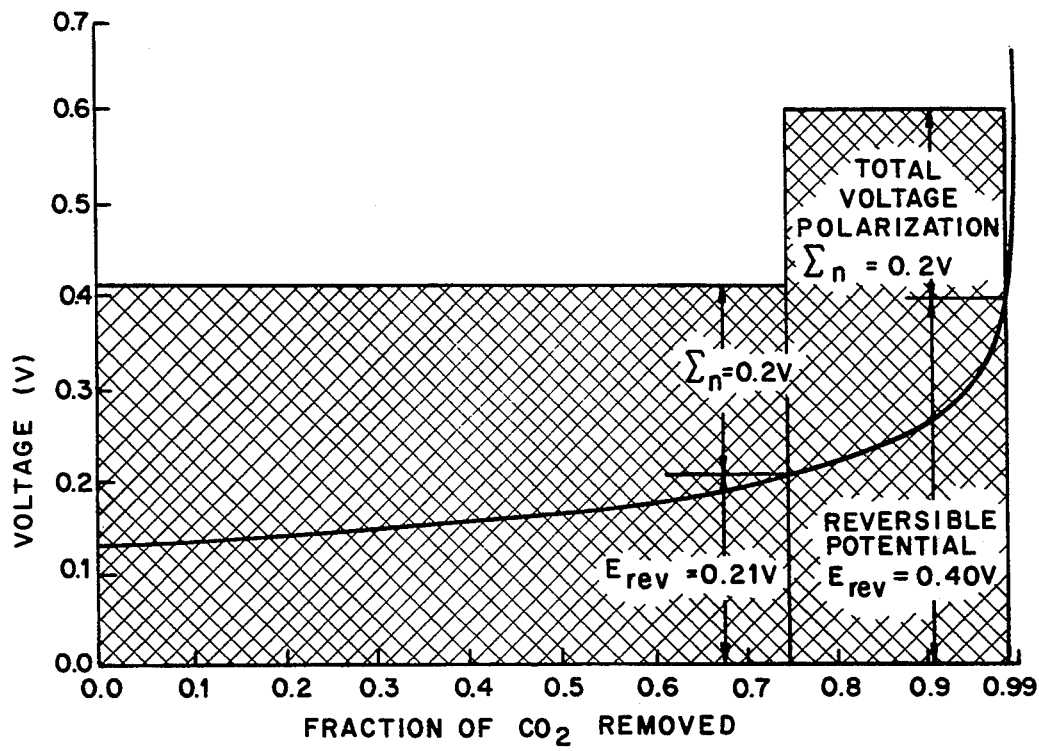
FIG. 9 is a graph illustrating the reduction in work required to separate $CO_2$ from the same stream as in FIG. 8 when two cell are networked in series.

FIG. 9 illustrates the advantage of networking two EMSDs in series to remove 99% of the carbon dioxide from the source gas stream described in FIG. 8. For comparison, the same overpotential was assumed (0.2 V) for each of the networked EMSDs as was assumed for the single EMSD in FIG. 8. As before, the shaded region represents the work which is required for the separation, as well as the heat which must be removed. A comparison of FIGS. 8 and 9 shows that the amount of work required by the; EMSD network is 24% less than what was required by the single EMSD. Since less work is required by EMSD networks, less heat is generated and the problem of heat removal is also, reduced.

Other electrochemical membranes, some developed for fuel cells, can be used in EMSDs. Such membranes transfer various ions and can be used to separate assorted chemical compounds at different temperatures, as shown in Table 1.

In addition to separating compounds, an EMSD can be used to control the decomposition or synthesis of certain compounds. Reactants can be supplied to either (or both) the anode and cathode chambers. The current can then be controlled by the voltage supply to adjust the flow and activity of the separated compound. Decompositions can be carried out in the source gas stream; syntheses in the separated gas stream. For example, as a molten carbonate EMSD depletes carbon dioxide from the oxidant, calcium carbonate ($CaCO_3$) might be decomposed there, forming calcium oxide (CaO) as it replenishes carbon dioxide. Or, as oxygen is depleted, hematite ($Fe_2O_3$) might be reduced. In addition, by carefully adjusting the current, a molten carbonate EMSD might be used to selectively oxidize a complex hydrocarbon at the anode.

TABLE 1

| Electrochemical Membrane | Other Electrochemical Membranes | | |
|---|---|---|---|
| | Ion Transferred | Compound(s) Separated | Temperature Range (K.) |
| Molten Carbonate | $CO_3^{-2}$ | $CO_2, O_2$ | 825–975 |
| Solid Oxide | $O^{-2}$ | $O_2$ | 875–1250 |
| Phosphoric Acid | $H^+$ | $H_2$ | $\approx 475$ |
| Sulfate | $SO_4^{-2}$ | $SO_2, O_2$ | 600–975 |
| Solid Polymer | $H^+$ | $H_2$ | $\approx 400$ |
| Sulfide | $S^{-2}$ | $H_2S$ | 600–975 |

Reactants can also be introduced in the anode chamber to facilitate separations in the cathode chamber. For example, a fuel at the anode can be used to remove sulfur dioxide ($SO_2$) from combustion gases in the cathode in a sulfate based EMSD. In this instance, the device could even be used to generate power, rather than to consume it.

An EMSD can also be used to measure the concentration of the separated compounds within its electrode chambers. The Nernst potential is a function of the partial pressures of these species. The open circuit voltage of the EMSD approximates the Nernst potential if the electrolyte has negligible electronic or mixed ionic conductivity and if the device has no short circuits. If the partial pressure(s) of the separated compound(s) in one, electrode chamber are known, then those in the other chamber can be determined from the open circuit voltage measurement.

Thus it will be seen that when electrochemical membranes are used in devices for separation (EMSDs) and power generation (fuel cells), they operate more efficiently in networks designed in accordance with the present invention. A network of EMSDs consumes less work and requires less heat removal than a single EMSD accomplishing the same separation.

It will be appreciated by those skilled in the art that .other potential applications for electrochemical membranes used in accordance with the method and systems of the present invention may include reaction control devices and concentration measurement systems. Further, it will be appreciated that other electrode chamber flow networked arrangements may be provided, including the serial anode combined with parallel cathode chamber flow.

Although the invention has been described by way of specific example of various preferred embodiments and method of operation thereof, it will be obvious that various modifications and changes may be made therein without departing from the spirit and scope of the invention as set forth in the following claims attached to and forming a part of this specification.

What is claimed is:

1. An electrochemically active system, comprising:
   a plurality of electrochemical devices each having an ionically conductive membrane, a porous anode disposed in contact with said ionically conductive membrane on one side thereof, a porous cathode disposed in contact with said ionically conductive membrane on a side thereof opposite said one side of said ionically conductive membrane, an anode process-fluid flow chamber disposed in fluid communication with said anode on a surface thereof opposite the surface contacting said ionically conductive membrane, and a cathode process-fluid flow chamber disposed in fluid communication with said cathode on a surface thereof opposite the surface contacting said electrochemical membrane;

means for electrically connecting said plurality of electrochemical devices in series;

a cathode process-fluid communicating means for connecting said cathode process-fluid flow chambers of each of said plurality of electrochemical devices in a serial fluid-flow arrangement through each of said plurality of electrochemical devices;

an anode process fluid communicating means for connecting said anode process-fluid flow chambers of each of said plurality of electrochemical devices in a serial fluid-flow arrangement so that said plurality of electrochemical devices are connected in a networked serial flow arrangement; and control means coupled with said anode and cathode process-fluid communicating means for separately controlling the process-fluid parameters of each of said plurality of electrochemical devices individually so that the operating efficiency of each of said plurality of electrochemical devices is improved, thereby improving the system efficiency.

2. An electrochemically active system as set forth in claim 1 wherein said plurality of electrochemical devices are fuel cells.

3. An electrochemically active system as set forth in claim 1 wherein said plurality of electrochemical devices are fluid separation devices.

4. An electrochemically active system as set forth in claim 2 wherein said fuel cells are molten carbonate fuel cells and further including a fuel inlet means for introducing a fuel stream containing hydrogen or its compounds into said anode process-fluid flow chamber of said networked fuel cells, and an oxidant inlet means for introducing a carbon dioxide and oxygen containing oxidant feed stream into said cathode process-fluid flow chamber of said networked fuel cells.

5. An electrochemically active system as set forth in claim 4 wherein said means for introducing a fuel stream includes means for introducing methane into said anode process-fluid flow chamber and wherein said molten carbonate fuel cells are internally reforming fuel cells wherein methane can be converted into a hydrogen containing fuel within said anode process-fluid flow chamber of each of said plurality of fuel cells and wherein said oxidant inlet means includes means for introducing air into said cathode process-fluid flow chamber.

6. An electrochemically active system as set forth in claim 5 wherein said control means includes means for introducing an amount of fuel to a first one of said networked fuel cells which is substantially greater than the amount consumed by said first one of said cells so that the voltage generated by said first one of said cells is greater than the remainder of said networked cells.

7. An electrochemically active system as set forth in claim 6 wherein said plurality of fuel cells is a plurality of N fuel cells each designed to consume essentially the same amount of fuel and wherein the amount of fuel introduced into said first one of said N plurality of fuel cells is about N times the amount of fuel to be consumed by one of said fuel cells so that the voltages generated by each cell in sequence is greater than the remaining ones of the sequence of said networked cells, thereby increasing the power output of said networked fuel cells.

8. An electrochemically active system as set forth in claim 7 wherein said anode process-fluid flow chambers of said plurality of fuel cells are connected in a serial fluid flow arrangement countercurrent to the direction of flow of said cathode process-fluid flow chambers of said plurality of fuel cells and wherein said control means further includes means for feeding forward a controlled portion of said methane fuel stream to aid in temperature control thereby reducing ohmic voltage losses, a cathode-to-cathode feedback means including a heat exchanger means for recycling a cooled portion of said oxidant stream through said cathode process-fluid flow chambers to remove heat from each of said cells of said network and to heat said oxidant feed stream, and an anode-to-cathode feed back means for feeding back a portion of said output fuel stream which includes $CO_2$ to said oxidant feed stream in an amount sufficient to raise the ratio of $CO_2$ to $O_2$ to a factor of about two.

9. An electrochemically active system as set forth in claim 8 wherein said control means further includes an anode-to-anode feedback means for feeding back a portion of the anode process-fluid stream containing steam formed as a result of anode reactions at the output of said Nth cell of said networked series of cells to the input fuel stream to promote reforming of the methane in said input fuel stream and prevent carbon deposition and to preheat fuel feed to a desired inlet temperature.

10. An electrochemically active system as set forth in claim 9 wherein said anode-to-cathode feed back means and said cathode-to-cathode feedback means further includes a combustor wherein cathode-to-cathode and anode-to-cathode feedback streams are combined to remove unburned fuel in said anode-to-cathode feedback stream and wherein an exhaust stream from said combustor forms an input stream to said heat exchanger so that the combined feedback stream can be cooled prior to being mixed with said oxidant input stream.

11. An electrochemically active system as set forth in claim 10 wherein said N plurality of cells are each formed of a fuel cell stack.

12. An electrochemically active system as set forth in claim 3 wherein said fluid separation devices are molten carbonate fluid separation devices for separating $CO_2$ and $O_2$ from a fluid stream forming a source gas stream and further including an inlet means for introducing said source gas stream into said cathode process-fluid flow chambers of said networked separation devices, and a separated stream outlet means for conveying the separated stream of $CO_2$ and $O_2$ from said anode process-fluid flow chamber of said networked separation devices.

13. An electrochemically active system as set forth in claim 12 wherein said anode process fluid communicating means includes means for connecting said anode process-fluid flow chambers of each of said plurality of separation devices in a serial fluid flow arrangement countercurrent to the flow direction of said cathode process fluid flow.

14. An electrochemically active system as set forth in claim 13 wherein said control means includes means for introducing an amount of $CO_2$ and $O_2$ to a first one of said networked separation devices which is substantially greater than the amount separated by said first one of said devices and a cooling means including a heat exchanger for continuously recirculating a portion of said separated stream passing through said anode process-fluid flow chamber through said heat exchanger.

15. A method for operating a networked plurality of electrochemically active devices wherein each of said devices includes an ionically conductive membrane, a porous anode disposed in contact with said ionically conductive membrane on one side thereof, a porous cathode disposed in contact with said ionically conductive membrane on a side thereof opposite said one side of said ionically conductive membrane, an anode process-fluid flow chamber disposed in fluid communication with said anode on a surface thereof opposite the surface contacting said ionically conductive membrane, and a cathode process-fluid flow chamber disposed in fluid communication with said cathode on a surface thereof opposite the surface contacting said electrochemical membrane and means for electrically connecting said plurality of electrochemically active devices in series, comprising the steps of:

flowing a cathode process-fluid through each of said cathode process-fluid flow chambers of each of said plurality of electrochemical devices in a serial fluid-flow arrangement;

flowing an anode process-fluid through said anode process-fluid flow chambers of each of said plurality of electrochemical devices in a serial fluid-flow arrangement so that said plurality of electrochemical devices are networked in a serial process flow arrangement; and separately controlling the process-fluid parameters of each of said plurality of electrochemical devices individually so that the operating efficiency dependent on process fluid parameters of each of said plurality of electrochemical devices is improved, thereby improving the system efficiency.

16. A method for operating a networked plurality of electrochemically active devices as set forth in claim 15 wherein said plurality of electrochemical devices are molten carbonate fuel cells and said anode process fluid includes a fuel stream containing hydrogen or compounds thereof and said cathode process fluid includes an oxidant containing $CO_2$ and $O_2$.

17. A method for operating a plurality of electrochemically active devices as set forth in claim 16 wherein said fuel stream is methane and further including the step of reforming said methane to produce a hydrogen containing fuel within said anode process-fluid flow chamber.

18. A method for operating a plurality of electrochemically active devices as set forth in claim 17 wherein the amount of fuel supplied to said first one of said networked fuel cells is substantially greater than the amount consumed by said first one of said cells so that the voltage generated by said first cell is greater than the remainder of said networked cells.

19. A method for operating a plurality of electrochemically active devices as set forth in claim 18 wherein said step of flowing an anode process-fluid includes flowing said anode process-fluid through said anode process-fluid flow chambers of each of said plurality of fuel cells in a direction countercurrent to the direction of flow of said cathode process-fluid flow through said fuel cells and further including the step of feeding forward a controlled portion of said methane fuel stream to each of said anode process fluid flow channels of each of said plurality of fuel cells to aid in temperature control and thereby reducing ohmic voltage loses, recycling a cooled portion of said oxidant stream through said cathode process-fluid flow chambers to remove heat from each of said cells of said network and wherein said oxidant is air and further including the step of feeding back a portion of said output fuel stream which includes $CO_2$ to said oxidant input stream in an amount sufficient to raise the ratio of $CO_2$ and $O_2$ to a factor of about two.

20. A method for operating a plurality of electrochemically active devices as set forth in claim 19 further including the step of feeding back a portion of the anode process-fluid stream containing steam formed as a result of anode reactions at the output of the last cell of said networked series of cells to the input fuel stream to promote reforming of said methane in said input fuel stream, prevent carbon dioxide deposition and to heat said input fuel stream to a desired inlet temperature.

21. A method for operating a plurality of electrochemically active devices as set forth in claim 20 further including the step of combining a portion of the cathode process fluid stream output with said feedback portion of said output fuel stream through a combustor to remove unburned fuel and a heat exchanger so that the combined feedback stream is cooled prior to being mixed with said oxidant input stream.

22. A method for operating a plurality of electrochemically active devices as set forth in claim 21 further including the step of altering the composition of the oxidant stream flowing through said cathode process-fluid flow chambers by feeding forward a controlled portion of said oxidant feed to each of said plurality of networked devices and removing heat from the anode and cathode process-fluid flow streams between each one of said plurality of networked devices to maintain a desired maximum operating temperature for each of said devices so that ohmic voltage loses are reduced.

23. A method for operating a plurality of electrochemically active devices as set forth in claim 22 wherein said plurality of cells are each formed of a fuel cell stack.

24. A method for operating a plurality of electrochemically active devices as set forth in claim 15 wherein said devices are fluid separation devices.

25. A method for operating a plurality of electrochemically active devices as set forth in claim 24 wherein said devices are molten carbonate devices for separating $CO_2$ and $O_2$ from a fluid stream forming said cathode process fluid into said anode process-fluid flowing through said anode process-fluid flow chambers of said networked devices wherein said step of flowing a cathode process-fluid through said cathode process-fluid flow chambers includes the step of introducing an amount of $CO_2$ and $O_2$ to a first one of said networked separation devices which is substantially greater than the amount separated by said first one of said devices and said step of flowing an anode process fluid includes flowing said anode process fluid through said anode process fluid flow chambers of each of said plurality of separation devices in a direction countercurrent to the direction of flow of said cathode process-fluid flow through said devices and further including the step of recirculating a portion of said anode process-fluid flow through a heat exchanger to cool said anode process-fluid flow sufficient to maintain a desired operating temperature for said series networked devices.

* * * * *